UNITED STATES PATENT OFFICE 2,647,901

1-(TERTIARY-AMINOALKYLAMINO) ACRIDONES AND THEIR METHOD OF PREPARATION

Sydney Archer, Albany, N. Y., assignor to Sterling Drug Inc., New York, N. Y., a corporation of Delaware No Drawing. Application May 6, 1952, Serial No. 286,427

22 Claims. (Cl. 260—279)

This invention relates to 1-(tertiary-aminoalkylamino) acridones and to their method of preparation. In particular, it relates to such acridones having the structure

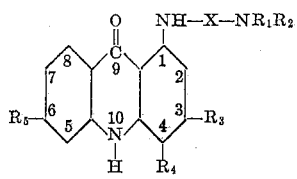

where X is $CH_2CHOHCH_2$ or a lower alkylene radical, $NR_1R_2$ is a tertiary-amino radical, and $R_3$, $R_4$ and $R_5$ are each hydrogen, a lower alkyl radical or a halo radical.

These compounds of my invention are useful because of their dyeing and tinting properties, the compounds being from yellow to orange in color. The compounds also have useful pharmaceutical properties, for instance, bacteriostatic and bactericidal properties.

In the above structure, X when a lower alkylene radical has its two connecting linkages on different carbon atoms, so therefore X must contain at least two carbon atoms. X contains preferably not more than six carbon atoms. Thus, X when lower alkylene includes such radicals as

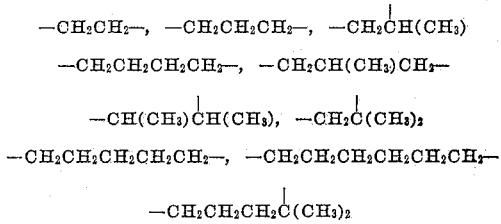

and the like. The tertiary-amino radical shown above as $NR_1R_2$ comprehends dialkylamino radicals where $R_1$ and $R_2$ are each lower alkyl radicals, alike or different, and each alkyl radical having preferably from one to six carbon atoms inclusive, such dialkylamino radicals including dimethylamino, methyl-ethylamino, diethylamino, diisopropylamino, ethyl-n-propylamino, di-n-butylamino, di-n-hexylamino, and the like. Also, the tertiary-amino radical designated as $NR_1R_2$ encompasses saturated N-heteromonocyclic radicals having five to six ring atoms, illustrated by examples such as 1-piperidyl; (lower alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower alkylated)-1-pyrrolidyl such as 2-methyl-1-pyrrolidyl, 2,5-dimethyl-1-pyrrolidyl; 4-morpholinyl; and the like. $R_3$, $R_4$ or $R_5$ when a halo radical means chloro, bromo, iodo and fluoro. $R_3$, $R_4$ or $R_5$ when a lower alkyl radical has preferably one to six carbon atoms inclusive, including such radicals as methyl, ethyl, n-propyl, isopropyl, n-butyl, isobutyl, 2-butyl, isoamyl, n-amyl, n-hexyl, and the like.

My compounds are prepared by heating a tertiary-aminoalklamine having the formula $$H_2N-X-NR_1R_2$$

with a 1-haloacridone having the formula

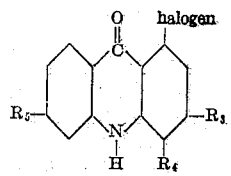

where halogen means chloro, bromo, iodo and fluoro, and where $R_3$, $R_4$ and $R_5$ have the meanings given hereinabove. Illustrations of this process and the resulting compounds of my invention are as follows: 1-(2-diethylaminoethylamino)-4-ethyl-6-bromoacridone from 2-diethylaminoethylamine and 1,6-dibromo-4-ethylacridone; 1-(3-dimethylamino-2-propylamino)-4-n-hexylacridone from 3-dimethylamino-2-propylamine and 1-chloro-4-n-hexylacridone; 1-(5-diethylamino-2-pentylamino)-3,4,6-trimethylacridone from 5-diethylamino-2-pentylamine and 1-chloro-3,4,6-trimethylacridone; 1-(3-diethylamino-2-2-hydroxypropylamino)-4-methyl-6-chloroacridone from 3-diethylamino-2-hydroxypropylamine and 1,6-dichloro-4-methylacridone; 1-(2-di-n-butylaminoethylamino)-3,4,6-trichloroacridone from 2-di-n-butylamineoethylamine and 1,3,4,6-tetrachloroacridone; 1-[3-(1-piperdyl)propylamino]-3-bromoacridone from 3-(1-piperidyl)propylamine and 1,3-dibromoacridone; 1-[2-(2-methyl-1-piperidyl)ethylamino]-4-n-propyl-6-iodoacridone from 2-(2-methyl-1-piperidyl)ethylamine and 1,6-diiodo-4-n-propylacridone; 1-[3-(1-pyrrolidyl)-propylamino]-4-methyl-6-n-butylacridone from 3-(1-pyrrolidyl)propylamine and 1-chloro-4-methyl-6-n-butylacridone; 1-[2-(2,5-dimethyl-1-pyrroolidyl)ethylamino]-3-isobutylacridone from 2-(2,5-dimethyl-1-pyrrolidyl)ethylamine and 1-chloro-3-isobutylacridone; 1-[2-(4-morpholinyl)ethylamino]-4-methyl-6-fluoroacridone from 2-(4-morpholinyl)-ethylamine and 1,6-difluoro-4-methylacridone.

The intermediate 1-haloacridones are generally known, as are their methods of preparation.

For example, a useful method is the cyclization of an ortho-(meta-halophenylamino)benzoic acid, preferably done by heating the benzonic acid derivative in the presence of a strong mineral acid. e. g., concentrated sulfuric acid. The ortho-substituted-benzoic acid is readily obtained by heating a metal salt, preferaby an alkali metal salt, of an ortho-halobenzoic acid with a meta-haloaniline in the presence of a copper powder catalyst. This method is illustrated by the preparation of 1-chloro-4-ethyl-6-bromoacridone by first heating potassium 2,4-dibromobenzoate with 2-ethyl-5-chloroaniline in the presence of copper powder to form potassium 2-(2-ethyl-5-chlorophenylamino)-4-bromobenzoate, which is isolated in the form of its acid, and then heating this substituted-benzoic acid with concentrated sulfuric acid to form the 1-chloro-4-ethyl-6-bromoacridone. Another illustration is the formation of 1-bromo-3,4-dimethyl-6-chloroacridone by first preparing 2 - (2,3 - dimethyl - 5 - bromophenylamino)-4-chlorobenzoic acid from potassium 2,4-dichlorobenzoate and 2,3 - dimethyl - 5-bromoaniline and then cyclizing said phenylaminochlorobenzoic acid.

My 1 - (tertiary - aminoalkylamino) acridones can be isolated either in the form of the free bases or in the form of their salts with relatively non-toxic organic or inorganic acids, and can be used in either form. In practicing my invention I have found it convenient to isolate my acridones in the form of their acid addition salts, especially the hydrochlorides; however, other acid addition salts are within the scope of my invention, such salts including the hydrobromides, hydroiodides, phosphates, sulfates, citrates, ethanesulfonates, tartrates, succinates, acetates, benzoates, mandelates, oleates, and the like.

My invention also comprehends quaternary ammonium salts of the above defined 1-(tertiary-aminoalkylamino)acridones, said salts being derived from alkyl or benzyl esters of an acid, either inorganic or organic. Such esters include methyl iodide, methyl bromide, ethyl chloride, ethyl bromide, ethyl sulfate, n-propyl iodide, isobutyl bromide, n-hexyl iodide, n-dodecyl chloride, benzyl chloride, methyl para-toluenesulfonate, ethyl para-toluenesulfonate, ethyl benzenesulfonate, and the like, the respective quaternary salts being the methiodides, methobromides, ethochlorides, ethobromides, ethosulfates, n-propiodides, isobutobromides, n-hexiodides, n-dodecochlorides, benzochlorides, metho-para-toluenesulfonates, etho-paratoluenesulfonates, ethobenzenesulfonates, and the like.

Specific embodiments of my invention are further illustrated in the following examples.

EXAMPLE 1

*1-(3-diethylaminopropylamino)-4-chloroacridone*

A mixture of 10 g. of 1,4-dichloroacridone and 25 g. of 3-diethylaminopropylamine was refluxed for four hours. The mixture was then steam distilled and the residue made basic. The basic mixture was allowed to settle and the supernatant liquor decanted through a filter aid. The filter aid and gummy residue were washed with water and then treated with a boiling 5% aqueous hydrogen chloride solution. The acidic solution was filtered and taken to dryness. The residual material was covered with ethanol and taken to dryness again; this procedure was repeated with ethanol and then once with toluene. The residue crystallized. The crystalline residue was boiled with absolute ethanol and to the boiling mixture was added about 10 ml. of ethanolic hydrogen chloride whereupon dissolution was effected. The hot solution was treated with decolorizing charcoal, filtered and the filtrate was treated with two volumes of ether. On cooling, crystals separated. A second recrystallization of this crystalline product from ethanol-ether, the ethanol containing a few ml. of ethanolic HCl, yielded as yellow-green plates the product, 1-(3-diethylaminopropylamino)-4-chloroacridone in the form of its hydrochloride salt. A sample of this product melted at 238.5–239.5° C. (cor.) when recrystallized once more from ethanol and dried at 1 mm. over concentrated sulfuric acid.

Anal.—Calcd. for $C_{20}H_{24}ClN_3O \cdot HCl$: N, 10.66; Cl, 17.98. Found: $H_2O$, 0.8; N, 10.38 (dry basis); Cl, 17.80 (dry basis).

1 - (3 - diethylaminopropylamino) - 4 - chloroacridone hydrochloride had bacteriostatic and bactericidal activity against the following organisms: *Streptococcus pyogenes, Eberthella typhosa, Brucella abortus, Mycobacterium tuberculosis* and *Clostridium welchii*.

1 - (3 - diethylaminopropylamino) - 4 - chloroacridone in free base form is obtained by treating an aqueous solution of its hydrochloride with alkali, e. g., 40% aqueous sodium hydroxide solution, extracting the product thereby liberated with chloroform and removing the chloroform by distilling in vacuo.

1 - (3 - diethylaminopropylamino) - 4 - chloroacridone in the form of a quaternary salt derivative is formed by treating the free base form of this compound with the appropriate alkyl or benzyl ester of an organic or inorganic acid. For example, its treatment, in ethanolic solution, with methyl iodide, ethyl sulfate, n-dodecyl chloride, benzyl chloride or ethyl para-toluenesulfonate results in the formation of 1-(3-diethylaminopropylamino)-4-chloroacridone methiodide, 1-(3 - diethylaminopropylamino) - 4 - chloroacridone ethosulfate, 1 - (3 - diethylaminopropylamino)-4-chloroacridone n-dodecochloride, 1-(3-diethylaminopropylamino) - 4 - chloroacridone benzochloride or 1 - (3 - diethylaminopropylamino)-4-chloroacridone etho-para-toluenesulfonate, respectively.

Other 1 - (tertiary - aminoalkylamino) - 4-haloacridones, in the form of their free bases, acid addition salts or quaternary ammonium salts, can be prepared according to the procedures given above but using other 1,4-dihaloacridones and tertiary-aminoalkylamines in place of 1,4-dichloroacridone and 3 - diethylaminopropylamine, respectively. Thus, 1-[3-(1-piperidyl)-propylamino]-4-chloroacridone is obtained from 1,4-dichloroacridone and 3-(1-piperidyl)propylamine; 1 - (3 - diethylamino - 2 - propylamino) - 4-bromoacridone, from 1,4-dibromoacridone and 1-diethylamino-2-propylamine (same as 3-diethylamino-2-propylamine); 1-[3-(2-methyl-1-piperidyl)propylamino]-4-chloroacridone, from 1,4-dichloroacridone and 3-(2-methyl-1-piperidyl)propylamine; 1 - [4 - (1 - pyrrolidyl)butylamino]-4-iodoacridone, from 1,4-diiodoacridone and 4 - (1 - pyrrolidyl)butylamine; 1 - [3 - (2,5-dimethyl - 1 - pyrrolidyl)propylamino] - 4 - chloroacridone, from 1,4-dichloroacridone and 3-(2,5-dimethyl-1-pyrrolidyl)-propylamine; 1-[2-(4 - morpholinyl)ethylamino] - 4 - fluoroacridone, from 1,4-difluoroacridone and 2-(4-morpholinyl)ethylamine; 1 - (2 - diethylaminoethylamino)-3-methyl-4-chloroacridone, from 1,4-dichloro-3-methylacridone and 2-diethylaminoethylamine; 1-[3-(1-piperidyl)propylamino]-3-n-propyl-4-bromoacridone, from 1,4-dibromo-3-n-propylacridone and 3-(1-piperidyl)-propylamine; 1-(2-diethylaminoethylamino)-3,6-diethyl-4-chloroacridone, from 1,4-dichloro-3,6-diethylacridone and 2-diethylaminoethylamine.

EXAMPLE 2

1-(5-diethylamino-2-pentylamino)-4-chloroacridone

A mixture of 10 g. of 1,4-dichloroacridone and 34 g. of 5-diethylamino-2-pentylamine was refluxed for two hours. The mixture was then made basic with 40% aqueous sodium hydroxide solution and steam distilled. The gummy residual material was taken up with 200 ml. of 10% aqueous acetic acid solution. This acidic solution was filtered and the filtrate made basic and cooled. The precipitated product was dissolved in ethanol and the resulting solution concentrated to dryness in vacuo. The residue was covered with toluene and taken to dryness again. The residue was then dissolved in ethanol and the ethanolic solution treated with ethanolic hydrogen chloride, followed by the addition of ether. The solid that separated was collected and recrystallized from absolute ethanol, with charcoaling, yielding as yellow prisms, 1-(5-diethylamino-2-pentylamino)-4-chloroacridone in the form of its hydrochloride, melting at 245–246.6° C. (cor.) when dried for forty-eight hours at 90° C.

Anal.—Calcd. for $C_{22}H_{28}ClN_3O \cdot HCl$: C, 62.55; H, 6.92; N, 9.97; Cl, 16.82. Found: C, 62.45; H, 6.94; N, 9.67; Cl, 16.62.

The above product had bacteriostatic and bactericidal activity against the following organisms: Streptococcus pyogenes, Eberthella typhosa, Brucella abortus, Mycobacterium tuberculosis and Clostridium welchii.

1-(5-diethylamino-2-pentylamino)-4-chloroacridone in the form of its free base is obtained by treating an aqueous solution of its hydrochloride with alkali, extracting the product thereby liberated with chloroform and removing the chloroform by distilling in vacuo.

Following the above procedure but using 1,4-dibromoacridone, 1,4-diiodoacridone or 1,4-difluoroacridone in place of 1,4-dichloroacridone, there is obtained, in the free base or acid addition salt form, 1-(5-diethylamino-2-pentylamino)-4-bromoacridone, 1-(5-diethylamino-2-pentylamino)-4-iodoacridone or 1-(5-diethylamino-2-pentylamino)-4-fluoroacridone, respectively.

EXAMPLE 3

A. 1,3-dichloroacridone

A mixture of 45 g. of potassium 2-bromobenzoate, 30 g. of 3,5-dichloroaniline, 100 g. of n-amyl alcohol and 1 g. of copper powder was refluxed with stirring for four hours. The reaction mixture was then steam distilled after the addition of a few ml. of aqueous potassium hydroxide solution. The residual material was filtered off and the filtrate was acidified, thereby precipitating a solid that was collected. The solid was recrystallized from acetic acid, adding enough water to the hot acetic acid to effect dissolution. There was thus obtained 28 g. of 2-(3,5-dichlorophenylamino)benzoic acid of sufficient purity to be used in the following reaction. A sample of this intermediate acid was recrystallized as above and submitted for analysis, M. P. 240–242° C.

Anal.—Calcd. for $C_{13}H_9Cl_2NO_2$: N, 4.94; Cl, 25.13. Found: N, 4.90; Cl, 24.34.

A mixture of 26 g. of 2-(3,5-dichlorophenylamino)benzoic acid and 170 ml. of concentrated sulfuric acid was stirred on a steam bath for one hour, poured into water and the product collected. The product was suspended in dilute aqueous sodium hydroxide solution, steam passed through the mixture for about thirty minutes and the solid filtered and dried. This product, 1,3-dichloroacridone, weighed about 22 g. and was used in the procedure described below as Example 3B. A sample of this product was recrystallized from pyridine for analysis, M. P. >250° C.

Anal.—Calcd. for $C_{13}H_7Cl_2NO$: Cl, 26.81; N, 5.3. Found: Cl, 26.48; N, 5.0.

Other 1,3-dihaloacridones can be prepared according to the procedure given above but using other potassium 2-halobenzoates and 3,5-dihaloanilines in place of potassium 2-bromobenzoate and 3,5-dichloroaniline, respectively. Thus, 1,3-dibromoacridone is obtained from potassium 2-bromobenzoate and 3,5-dibromoaniline; 1,3-diiodoacridone, from potassium 2-bromobenzoate and 3,5-diiodoaniline; 1,3-difluoroacridone, from potassium 2-bromobenzoate and 3,5-difluoroaniline; 1,3-dichloro-4-methylacridone, from potassium 2-bromobenzoate and 2-methyl-3,5-dichloroaniline; 1,3-dichloro-4-methyl-6-ethylacridone, from potassium 2-bromo-4-ethylbenzoate and 2-methyl-3,5-dichloroaniline; 1,3-dibromo-6-n-hexylacridone, from potassium 2-bromo-4-n-hexylbenzoate and 3,5-dibromoaniline.

B. 1-(3-diethylaminopropylamino)-3-chloroacridone

A mixture of 15 g. of 1,3-dichloroacridone and 50 g. of 3-diethylaminopropylamine was refluxed for four hours. The mixture was poured into water and the solution treated with hydrogen chloride. Addition of ethanol was necessary to effect complete dissolution of the product. The solution was then filtered and the filtrate made basic and cooled. The solid was collected and recrystallized twice from ethanol-water, using decolorizing charcoal the second time. The solid was then dissolved in absolute ethanol and ethanolic hydrogen chloride added. The precipitated product, 1-(3-diethylaminopropylamino)-3-chloroacridone in the form of its hydrochloride, melted at 269.8–270.8° C. (cor.) when dried at 65° C. overnight.

Anal.—Calcd. for $C_{20}H_{24}ClN_3O \cdot HCl$: N, 10.66; Cl, 17.98. Found: $H_2O$, 1.54; N, 10.57 (dry basis); Cl, 17.88 (dry basis).

The above product had bacteriostatic and bactericidal activity against the following organisms: Streptococcus pyogenes, Eberthella typhosa, Brucella abortus, Mycobacterium tuberculosis and Clostridium welchii.

1-(3-diethylaminopropylamino)-3-chloroacridone in the form of its free base is obtained by treating an aqueous solution of its hydrochloride with 40% aqueous sodium hydroxide solution, extracting the product that separates with chloroform and removing the chloroform by distilling in vacuo.

Following the above procedure but using 1,3-dibromoacridone, 1,3-diiodoacridone or 1,3-difluoroacridone in place of 1,3-dichloroacridone, there is obtained 1-(3-diethylaminopropylamino)-3-bromoacridone, 1-(3-diethylaminopropylamino)-3-iodoacridone or 1-(3-diethylaminopropylamino)-3-fluoroacridone, respectively.

Other 1-(tertiary-aminoalkylamino)-3-haloacridones, in the form of their free bases or acid addition salts, can be prepared according to the procedure given above, but using other 1,3-dihaloacridones and tertiary-aminoalkylamines in place of 1,3-dichloroacridone and 3-diethylaminopropylamine, respectively. Thus, 1-[3-(1-piperidyl)propylamino]-3-chloroacridone is obtained from 1,3-dichloroacridone and 3-(1-piperidyl)propylamine; 1 - (5-diethylamino-2-pentylamino)-3-bromoacridone, from 1,3-dibromoacridone and 5-diethylamino-2-pentylamine; 1 - [3-(2 - methyl-1-piperidyl)propylamino]-3-chloroacridone, from 1,3-dichloroacridone and 3-(2-methyl-1-piperidyl)propylamine; 1 - [4 - (1-pyrrolidyl)butylamino]-3-iodoacridone, from 1,3-diiodoacridone and 4-(1-pyrrolidyl)butylamine; 1-[3-(2,5-dimethyl-1 - pyrrolidyl)propylamino]-3-chloroacridone, from 1,3-dichloroacridone and 3-(2,5-dimethyl-1 - pyrrolidyl)propylamine; 1 - [2-(4-morpholinyl)ethylamino]-3-fluoroacridone, from 1,3-difluoroacridone and 2-(4-morpholinyl)ethylamine; 1-(2-diethylaminoethylamino)-3-chloro-4-methylacridone, from 1,3-dichloro-4-methylacridone and 2-diethylaminoethylamine; 1-[3-(1 - piperidyl)propylamino] - 3 - bromo-4-n-propylacridone, from 1,3-dibromo-4-n-propylacridone and 3-(1-piperidyl)-propylamine; 1-(2 - diethylaminoethylamino) - 3 - chloro - 4-methyl-6-ethylacridone, from 1,3-dichloro-4-methyl-6-ethylacridone and 2-diethylaminoethylamine; 1 - [2-(1-piperidyl)ethylamino]-3-bromo-6-n-hexylacridone, from 1,3-dibromo-6-n-hexylacridone and 2-(1-piperidyl)ethylamine.

EXAMPLE 4

A. *1,4,6-trichloroacridone*

The intermediate 2-(2,5-dichlorophenylamino)-4-chlorobenzoic acid was prepared following the procedure described above for Example 3A, but using 21 g. of potassium 2,4-dichlorobenzoate, 16 g. of 2,5-dichloroaniline, 50 ml. of n-amyl alcohol and 1 g. of copper powder. This intermediate acid was obtained as light yellow needles, M. P. 262–264° C. when dried at 100° C.

Anal.—Calcd. for $C_{13}H_8Cl_3NO_2$: N, 4.43; Cl, 33.60. Found: N, 4.30; Cl, 35.10.

1,4,6-Trichloroacridone was then obtained following the procedure described above in Example 3A but using 6 g. of 2-(2,5-dichlorophenylamino)-4-chlorobenzoic acid, 80 g. of concentrated sulfuric acid and a heating period of one-half hour on a steam bath. The product, 1,4,6-trichloroacridone, weighed 4.3 g. after one recrystallization from acetic acid and drying at 100° C. for twenty-four hours; M. P. 242–243° C.

Anal.—Calcd. for $C_{13}H_6Cl_3NO$: N, 4.68; Cl, 35.63. Found: N, 4.56; Cl, 35.55.

Other 1,4,6-trihaloacridones can be prepared according to the procedure given above but using other potassium 2,4-dihalobenzoates and 2,5-dihaloanilines in place of potassium 2,4-dichlorobenzoate and 2,5-dichloroaniline, respectively. Thus, 1,4,6-tribromoacridone is obtained from potassium 2,4-dibromobenzoate and 2,5-dibromoaniline; 1,4,6-triiodoacridone, from potassium 2 - bromo - 4 - iodobenzoate and 2,5-diiodoaniline; 1,4,6-trifluoroacridone, from potassium 2-bromo-4-fluorobenzoate and 2,5-difluoroaniline; 1,4,6 - trichloro - 3 - methylacridone, from potassium 2,4-dichlorobenzoate and 2,5-dichloro - 3 - methylaniline; 1,4,6-trichloro-3-ethylacridone, from potassium 2,4-dichlorobenzoate and 2,5-dichloro-3-ethylaniline; 1,4,6-tribromo-3-n-hexylacridone, from potassium 2,4 - dibromobenzoate and 2,5 - dibromo-3-n-hexylaniline.

B. *1-(3-diethylaminopropylamino)-4,6-dichloroacridone*

A mixture of 12 g. of 1,4,6-trichloroacridone and 32 g. of 3-diethylaminopropylamine was refluxed for three hours. The mixture was poured into water, and the solution was treated with hydrochloric acid and cooled. The precipitate that separated was collected and recrystallized several times from absolute ethanol. There was thus obtained as yellow prisms, 7.7 g. of 1-(3-diethylaminopropylamino) - 4,6 - dichloroacridone as its hydrochloride, M. P. 256–258° C. (cor.) when dried at 100° C. for ninety-six hours.

Anal.—Calcd. for $C_{20}H_{22}Cl_2N_3O \cdot HCl$: N, 9.85; 24.93. Found: N, 9.75; Cl, 24.69.

The above product had bacteriostatic and bactericidal activity against the following organisms: *Streptococcus pyogenes, Eberthella typhosa, Brucella abortus, Mycobacterium tuberculosis* and *Clostridium welchii*.

Other 1 - (tertiary - aminoalkylamino) - 4,6-dihaloacridones, in the form of their free bases or salts, can be prepared according to the procedure given above, but using other 1,4,6-trihaloacridones and tertiary-aminoalkylamines in place of 1,4,6-trichloroacridone and 3-diethylaminopropylamine, respectively. Thus, 1-[3-(1-piperidyl)propylamino] - 4,6 - dichloroacridone is obtained from 1,4,6-trichloroacridone and 3-(1-piperidyl)propylamine; 1 - (5 - diethylamino - 2-pentylamino)-4,6-dibromoacridone, from 1,4,6-tribromoacridone and 5-diethylamino-2-pentylamine; 1-[3-(2-methyl-1-piperidyl)propylamino]-4,6-dichloroacridone, from 1,4,6-trichloroacridone and 3-(2-methyl-1-piperidyl)propylamine; 1 - [4 - (1-pyrrolidyl)butylamino]- 4,6-diiodoacridone, from 1,4,6-triiodoacridone and 4-(1-pyrrolidyl)butylamine; 1-[3-(2,5-dimethyl-1 - pyrrolidyl)propylamino] - 4,6 - dichloroacridone, from 1,4,6-trichloroacridone and 3-(2,5-dimethyl-1-pyrrolidyl)propylamine; 1-[2-(4-morpholinyl)ethylamino]-4,6-difluoroacridone, from 1,4,6-trifluoroacridone and 2-(4-morpholinyl)-ethylamine; 1 - (2 - diethylaminoethylamino) - 3 - methyl - 4,6 - tricholoroacridone, from 1,4,6-trichloro-3-methylacridone and 2-diethylaminoethylamine; 1-[3-(1-piperidyl)propylamino]-3-ethyl-4,6-dichloroacridone, from 1,4,6-trichloro-3-ethylacridone and 3-(1-piperidyl)propylamine; 1 - [2 - (1 - piperidyl)ethylamino] - 3 - n - hexyl-4,6-dibromoacridone, from 1,4,6-tribromo-3-n-hexylacridone and 2-(1-piperidyl)ethylamine.

EXAMPLE 5

*1-(3-diethylamino-2-hydroxypropylamino)-4,6-dichloroacridone*

A mixture of 20 g. of 1,4,6-trichloroacridone and 50 g. of 3-diethylamino-2-hydroxypropylamine was refluxed for two hours. The reaction mixture was made basic with sodium hydroxide solution and steam distilled. The residual mixture was cooled and the material that solidified was collected and taken up in dilute aqueous hydrochloric acid. The acidic solution was filtered and the filtrate made basic. The resulting solution was cooled, whereupon there separated a solid which was collected and recrystallized twice from dilute ethanol. This product was recrystallized two additional times from benzene-n-hexane, thereby yielding as small orange prisms, 1-(3-diethylamino - 2 - hydroxypropylamino) - 4,6 - dichloroacridone, M. P. 160–162° C. (cor.).

Anal.—Calcd. for C₂₀H₂₃Cl₂N₃O₂: N, 10.29; Cl, 17.37. Found: N, 10.11; Cl, 17.11.

The above product had bacteriostatic and bactericidal activity against the following organisms: *Streptococcus pyogenes, Eberthella typhosa, Brucella abortus, Mycobacterium tuberculosis* and *Clostridium welchii*.

1 - (3 - diethylamino - 2 - hydroxypropylamino)-4,6-dichloroacridone in the form of a quaternary salt derivative is formed by treating the base form of this compound with the appropriate alkyl or benzyl ester of an organic or inorganic acid. For example, its treatment, in ethanolic solution, with methyl iodide, ethyl sulfate, n-dodecyl chloride, benzyl chloride or ethyl paratoluenesulfonate results in the formation of 1 - (3 - diethylamino - 2 - hydroxypropylamino) - 4,6-dichloroacridone methiodide, 1-(3-diethylamino - 2 - hydroxypropylamino) - 4,6 - dichloroacridone ethosulfate, 1-(3-diethylamino-2-hydroxypropylamino)-4,6-dichloroacridone n-dodecochloride, 1-(3-diethylamino-2-hydroxypropylamino)-4,6-dichloroacridone benzochloride or 1 - (3 - diethylamino - 2 - hydroxypropylamino) - 4,6-dichloroacridone etho-para-toluenesulfonate, respectively.

1 - (3 - diethylamino - 2 - hydroxypropylamino)-4,6-dichloroacridone in the form of an acid addition salt is obtained by treating the free base form with the appropriate acid. For example, treatment of an ethanolic solution of this acridone with hydrogen chloride results in the formation of 1-(3-diethylamino-2-hydroxypropylamino)-4,6-dichloroacridone as its hydrochloride.

Other 1-(3-tertiary-amino-2-hydroxypropylamino) acridones, in the form of their free bases or addition salts, can be prepared according to the procedures given above, but using other 1-haloacridones and 3 - tertiary - amino - 2 - hydroxypropylamines in place of 1,4,6-trimethylacridone and 3-diethylamino-2-hydroxypropylamine, respectively. Thus, 1-(3-di-n-propylamino-2-hydroxypropylamino)-4-chloroacridone is obtained from 1,4-dichloroacridone and 3-di-n-propylamino-2-hydroxypropylamine; 1-(3-diethylamino-2-hydroxypropylamino) acridone, from 1-chloroacridone and 3-diethylamino-2-hydroxypropylamine; 1-[3-(1-piperidyl)-2-hydroxypropylamino] - 3 - n - propyl - 4 - bromoacridone, from 1,4-dibromo-3-n-propylacridone and 3-(1-piperidyl)-2-hydroxypropylamine; 1-[3-(2-methyl - 1 - piperidyl) - 2 - hydroxypropylamino]-3,6-diethyl-4-chloroacridone, from 1,4-dichloro-3,6-diethylacridone and 3-(2-methyl-1-piperidyl) - 2 - hydroxypropylamine; 1 - [3 - (1 - pyrrolidyl) - 2 - hydroxypropylamino] - 4 - iodoacridone, from 1,4-diiodoacridone and 3-(1-pyrrolidyl)-2-hydroxypropylamine; 1-[3-(2-methyl-1 - pyrrolidyl) - 2 - hydroxypropylamino] - 3 - chloro-4-methylacridone, from 1,3-dichloro-4-methylacridone and 3-(2-methyl-1-pyrrolidyl) - 2-hydroxypropylamine; 1-[3-(4-morpholinyl)-2-hydroxypropylamino) - 3 - chloro - 4 - methyl-6-ethylacridone, from 1,3-dichloro-4-methyl-6-ethylacridone and 3-(4-morpholinyl)-2-hydroxypropylamine; 1-(3-diethylamino-2-hydroxypropylamino)-3-bromo-6-n-hexylacridone, from 1,3-dibromo - 6 - n - hexylacridone and 3 - diethylamino - 2 - hydroxypropylamine; 1-(3-diethylamino - 2 - hydroxypropylamino) - 4,6 - dibromoacridone, from 1,4,6-tribromoacridone and 3-diethylamino-2-hydroxypropylamine; 1-(3-diethylamino - 2 - hydroxypropylamino) - 4,6 - trichloro-3-methylacridone, from 1,4,6-tricholor-3-methyloacridone and 3-diethylamino-2-hydroxypropylamine.

EXAMPLE 6

*1-(2-di - n - butylaminoethylamino) -4 - methylacridone*

A mixture of 10 g. of 1-chloro-4-methylacridone and 20 g. of 2-di-n-butylaminoethylamine was refluxed gently for sixteen hours. The reaction mixture was poured onto ice and the solid that separated was collected. The solid was taken up in 100 ml. of acetic acid and the acidic solution diluted with about eight volumes of water. The resulting solution was filtered through a filter aid and the filtrate made basic, whereupon a solid separated. The solid was recrystallized once from 70% aqueous ethanol and once from ethanol, resulting in 5.0 g. of yellow crystalline 1-(2-di-n - butylaminoethylamino)-4-methylacridone, M. P. 158.7–159.2° C. (cor.) when dried at 75° C.

Anal.—Calcd. for C₂₄H₃₃N₃O: C, 75.95; H, 8.76; N, 11.07. Found: C, 75.70; H, 8.52; N, 11.20.

When the above procedure is followed but using 1-chloro - 3-methylacridone, 1 - bromo-6-ethylacridone or 1-chloroacridone in place of 1-chloro-4-methylacridone, there is obtained 1-(2-di-n-butylaminoethylamino) - 3-methylacridone, 1-(2-di-n-butylaminoethylamino) - 6-ethylacridone or 1-(2-di-n - butylaminoethylamino) acridone, respectively.

1-(2-di-n-butylaminoethylamino) - 4-methylacridone in the form of its hydrochloride addition salt was obtained by suspending the yellow crystalline base form in hot absolute ethanol, adding ethanolic hydrogen chloride until the solution was acidic, adding absolute ether and triturating, while cooling, the gummy precipitate with a glass rod until crystalline. The yellow crystals were collected and recrystallized from absolute ethanol, yielding 1-(2-di-n-butylaminoethylamino)-4-methylacridone as its hydrochloride monohydrate, M. P. 197.8–200° C. (cor.) when dried at 75° C.

Anal.—Calcd. for C₂₄H₃₃N₃O.Hcl.H₂O: N, 9.68; Cl. 8.17. Found: N, 9.77; Cl, 8.24.

Other 1-(tertiary - aminoalkylamino)-4-alkylacridones can be prepared according to the procedure given above but using other 1-halo-4-alkylacridones and tertiary-aminoalkylamines in place of 1-chloro-4-methylacridone and 2-di-n-butylaminoethylamine, respectively. Thus, 1-[3-(1-piperidyl) propylamino] - 4-n - butylacridone is obtained from 1-chloro-4-n-butylacridone and 3-(1-piperidyl) propylamine; 1 - (3-diethylamino-2-propylamino) -3,4-diethylacridone, from 1-chloro-3,4-diethylacridone and 1-diethylamino-2-propylamine; 1-[3-(2-methyl-1-piperidyl) propylamino]-3 - bromo-4 - isobutylacridone, from 1,3-dibromo-4-isobutylacridone and 3-(2-methyl-1-piperidyl) propylamine; 1-[3-(1-piperidyl) propylamino]-3-chloro-4,6 - dimethylacridone, from 1,3 - dichloro-4,6 - dimethylacridone and 3-(1-piperidyl) propylamine; 1-[4-(1-pyrrolidyl) butylamino]-3,4,6-trimethylacridone, from 1-chloro-3,4,6- trimethylacridone and 4-(1-pyrrolidyl)-butylamine; 1-[3-(2,5 - dimethyl-1-pyrrolidyl) - propylamino]-3,6 -diiodo-4 - n-propylacridone, from 1,3,6-triiodo-4-n - propylacridone and 3-(2,5-dimethyl-1 - pyrrolidyl) propylamine; 1-[2-(4-morpholinyl) ethylamino]-4-n - hexyl-6-bromoacridone, from 1,6-dibromo-4-n-hexylacridone and 2-(4-morpholinyl)ethylamine.

EXAMPLE 7

A. *1,6-dichloro-4-methylacridone*

The intermediate 2-(2-methyl-5-chlorophenyl-amino)-4-chlorobenzoic acid was prepared following the procedure described above for Example 3A but using 103 g. of potassium 2,4-dichlorobenzoate, 70 g. of 2-methyl-5-chloroaniline, 270 ml. of n-amyl alcohol and 5 g. of copper powder. There was thus obtained 32 g. of product (recrystallized once from aqueous acetic acid) of sufficient purity for use in the following cyclization reaction. A small sample was recrystallized a second time from acidic acid for analysis; M. P. 234–235° C.

Anal.—Calcd. for $C_{14}H_{11}Cl_2NO_2$: N, 4.72. Found: N, 4.08.

A mixture of 30 g. of 2-(2-methyl-5-chlorophenylamino)benzoic acid and 220 ml. of concentrated sulfuric acid was heated at about 95° C. for four hours. The cooled reaction mixture was poured into ice water with stirring. The solid that separated was collected, suspended in dilute aqueous ammonium hydroxide solution and steam was passed through the resulting mixture for about thirty minutes. The remaining solid was collected and dried at 95° C. There was thus obtained 29 g. of 1,6-dichloro-4-methylacridone which was used without further purification in the reaction given below as Example 7B.

B. *1-(2-di-n-butylaminoethylamino)-4-methyl-6-chloroacridone*

A mixture of 10 g. of 1,6-dichloro-4-methylacridone and 25 ml. of 2-di-n-butylaminoethylamine was heated at 200–210° C. for four hours. The reaction mixture was dissolved in ethanol and the ethanolic solution was treated with decolorizing charcoal, filtered and cooled. The resulting precipitate was recrystallized from ethanol, yielding 6.8 g. of yellow crystalline 1-(2-di-n-butylaminoethylamino)-4-methyl-6-chloroacridone, M. P. 146.5–148.1° (cor.) when dried at 80° C.

Anal.—Calcd. for $C_{24}H_{32}ClN_3O$: N, 10.15; Cl, 8.56. Found: N, 9.97; Cl, 8.79.

I claim:

1. An acridone having the structure

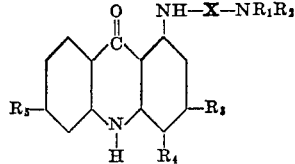

where X is a member of the group consisting of $CH_2CHOHCH_2$ and a lower alkylene radical having its two connecting linkages on different carbon atoms, $NR_1R_2$ is a member of the group consisting of lower dialkylamino, 1-piperidyl, (lower alkylated)-1-piperidyl, 1-pyrrolidyl, (lower alkylated)-1-pyrrolidyl and 4-morpholinyl, $R_3$, $R_4$ and $R_5$ are each members of the group consisting of hydrogen, lower alkyl radicals and halo radicals.

2. A 1-(dialkylaminoalkylamino)-4-haloacridone having the structure

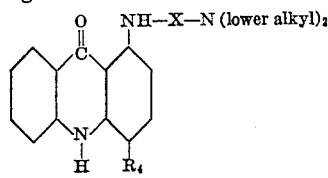

where X is a lower alkylene radical having its two connecting linkages on different carbon atoms, and $R_4$ is a halo radical.

3. A 1-(dialkylaminoalkylamino)-4,6-dihaloacridone having the structure

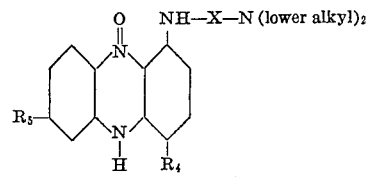

where X is a lower alkylene radical having its two connecting linkages on different carbon atoms, and $R_4$ and $R_5$ are each halo radicals.

4. A 1-(dialkylaminoalkylamino)-3-haloacridone having the structure

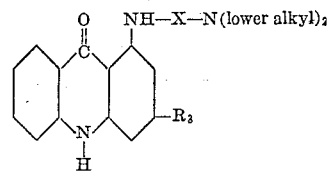

where X is a lower alkylene radical having its two connecting linkages on different carbon atoms and $R_3$ is a halo radical.

5. A 1-(dialkylaminoalkylamino)-4-alkyl-6-haloacridone having the structure

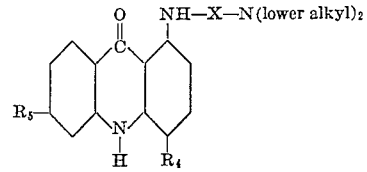

where X is a lower alkylene radical having its two connecting linkages on different carbon atoms, $R_4$ is a lower alkyl radical and $R_5$ is a halo radical.

6. A 1-(3-dialkylamino-2-hydroxypropylamino)-4,6-dihaloacridone having the structure

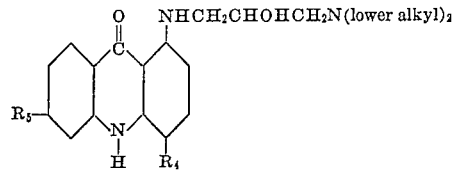

where $R_4$ and $R_5$ are each halo radicals.

7. A 1-(dialkylaminoalkylamino)-4-chloroacridone having the structure

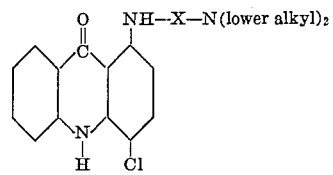

where X is a lower alkylene radical having its two connecting linkages on different carbon atoms.

8. A 1-(dialkylaminoalkylamino)-4,6-dichloroacridone having the structure

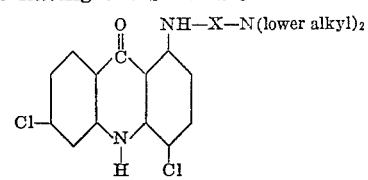

where X is a lower alkylene radical having its two connecting linkages on different carbon atoms.

9. A 1 - (dialkylaminoalkylamino) - 3 - chloro- acridone having the structure

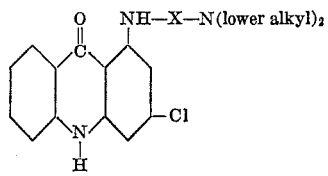

where X is a lower alkylene radical having its two connecting linkages on different carbon atoms.

10. A 1-(dialkylaminoalkylamino)-4-methyl-6-chloroacridone having the structure

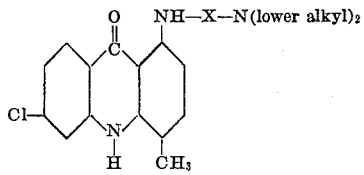

where X is a lower alkylene radical having its two connecting linkages on different carbon atoms.

11. A 1 - (3 - dialkylamino - 2 - hydroxypropylamino) - 4,6 - dichloroacridone having the structure

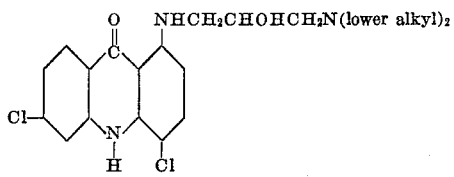

12. The process of preparing an acridone having the structure

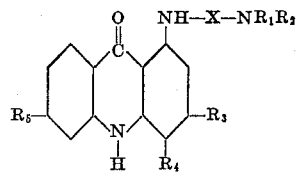

where X is a member of the group consisting of $CH_2CHOHCH_2$ and a lower alkylene radical having its two connecting linkages on different carbon atoms, $NR_1R_2$ is a member of the group consisting of lower dialkylamino, 1-piperidyl, (lower alkylated) - 1 - piperidyl, 1 - pyrrolidyl, (lower alkylated) - 1 - pyrrolidyl and 4 - morpholinyl, $R_3$, $R_4$ and $R_5$ are each members of the group consisting of hydrogen, lower alkyl radicals and halo radicals, which comprises heating a 1-haloacridone having the structure

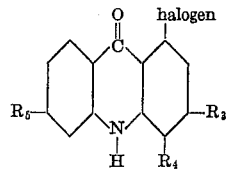

with a diamine having the formula

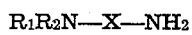

13. A process according to claim 12 where X is a lower alkylene radical having its two connecting linkages on different carbon atoms, $R_1$ and $R_2$ are each lower alkyl radicals, $R_4$ is a halo radical, and $R_3$ and $R_5$ are each H.

14. A process according to claim 12 where X is a lower alkylene radical having its two connecting linkages on different carbon atoms, $R_1$ and $R_2$ are each lower alkyl radicals, $R_3$ is H, and $R_4$ and $R_5$ are each halo radicals.

15. A process according to claim 12 where X is a lower alkylene radical having its two connecting linkages on different carbon atoms, $R_1$ and $R_2$ are each lower alkyl radicals, $R_3$ is a halo radical, and $R_4$ and $R_5$ are each H.

16. A process according to claim 12 where X is a lower alkylene radical having its two connecting linkages on different carbon atoms, $R_1$ and $R_2$ are each lower alkyl radicals, $R_3$ is H, $R_4$ is a lower alkyl radical and $R_5$ is a halo radical.

17. A process according to claim 12 where X is $CH_2CHOHCH_2$, $R_1$ and $R_2$ are each lower alkyl radicals, $R_3$ is H, and $R_4$ and $R_5$ are each halo radicals.

18. 1 - (3 - diethylaminopropylamino) - 4-chloroacridone.

19. 1 - (3 - diethylaminopropylamino) - 4,6-dichloroacridone.

20. 1 - (3 - diethylaminopropylamino) - 3-chloroacridone.

21. 1 - (2 - di - n - butylaminoethylamino) - 4 - methyl - 6 - chloroacridone.

22. 1 - (3 - diethylamino - 2 - hydroxypropylamino) - 4,6 - dichloroacridone.

SYDNEY ARCHER.

No references cited.